(12) United States Patent
Rapp

(10) Patent No.: US 6,369,317 B1
(45) Date of Patent: Apr. 9, 2002

(54) SAFER LIGHTNING ROD AND WARNING SYSTEM

(75) Inventor: Robert W. Rapp, Golden, CO (US)

(73) Assignee: National Lightning Protection Corporation, Denver, CO (US)

(*) Notice: Subject to any disclaimer, the term of this patent is extended or adjusted under 35 U.S.C. 154(b) by 0 days.

(21) Appl. No.: 09/762,159

(22) PCT Filed: Sep. 1, 1999

(86) PCT No.: PCT/US99/20187

§ 371 Date: Feb. 2, 2001

§ 102(e) Date: Feb. 2, 2001

(87) PCT Pub. No.: WO00/27010

PCT Pub. Date: May 11, 2000

Related U.S. Application Data

(60) Provisional application No. 60/106,166, filed on Oct. 29, 1998.

(51) Int. Cl.$^7$ ................................................ H01B 13/00
(52) U.S. Cl. ........................ 174/5 R; 174/2; 174/3; 174/55 G; 174/55 B
(58) Field of Search ............................ 174/2, 3, 5 R, 174/55 G, 4 R, 55 B; 361/39, 40, 117

(56) References Cited

U.S. PATENT DOCUMENTS

| 492,512 | A | | 2/1893 | Hum |
| 951,411 | A | | 3/1910 | Anderson |
| 4,000,539 | A | | 1/1977 | Neyer ........................... 16/121 |
| D252,616 | S | | 8/1979 | Hosokawa et al. ......... D10/105 |
| 4,180,698 | A | | 12/1979 | Carpenter, Jr. ................. 174/2 |
| 4,202,378 | A | | 5/1980 | Bush et al. .................... 138/96 |
| 4,204,238 | A | | 5/1980 | Stetson ........................ 361/125 |
| D262,093 | S | | 12/1981 | Bush et al. ................... D8/386 |
| 4,308,701 | A | | 1/1982 | Wojick ......................... 52/244 |
| 4,447,847 | A | * | 5/1984 | Drulard ....................... 361/117 |
| 4,502,093 | A | | 2/1985 | Saurerman ................... 361/231 |
| 4,540,844 | A | | 9/1985 | Sautereau et al. ............. 174/3 |
| 4,605,814 | A | | 8/1986 | Gillem .......................... 174/2 |
| D286,043 | S | | 10/1986 | Peterson ..................... D14/90 |
| 4,663,692 | A | | 5/1987 | Carothers et al. ........... 361/117 |
| 4,752,854 | A | | 6/1988 | Lefort et al. ................ 361/117 |
| 4,760,213 | A | | 7/1988 | Gumley ......................... 174/3 |

(List continued on next page.)

FOREIGN PATENT DOCUMENTS

WO        WO 00/27010        5/2000

OTHER PUBLICATIONS

"8 CCR§1712", Barclays Official California Code of Regulations, 4 pages, 1999.
"8 CCR§1926", Barclays Official California Code of Regulations, 1 page, 1999.

(List continued on next page.)

Primary Examiner—Anthony Dinkins
Assistant Examiner—W. David Walkenhorst
(74) Attorney, Agent, or Firm—Santangelo Law Offices, PC

(57) ABSTRACT

A lightning rod system including both methods and specific types of lightning rod protection apparatus, which address the need for lightning rod safety features to deter impalement and minimize injury when humans inadvertently fall upon or strike the projecting air terminal through use of a hebetative contagious impact surface (10) on an end cap(s). The system involves lightning rod system components such as humanized quantal rod (3) or coil spring coupler (13) engineered to be responsive within the range of forces achieved when a human of average size and weight falls onto the projecting air terminal from a standing surface level with that on which the lightning rod system is mounted to. The lightning rod system also involves a method and engineered components to retrofit existing lightning rod assemblies. Additionally, the system components address the need for a safety warning air terminal system to prevent impalement and injury from projecting air terminals that are not designed to be conducive to a lightning strike.

37 Claims, 14 Drawing Sheets

U.S. PATENT DOCUMENTS

| | | | | |
|---|---|---|---|---|
| 4,816,611 | A | 3/1989 | Invernizzi | 174/2 |
| 4,833,850 | A | 5/1989 | Lunn | 52/301 |
| D305,104 | S | 12/1989 | Heary | D10/105 |
| D305,309 | S | 1/1990 | Heary | D10/105 |
| 4,910,636 | A | 3/1990 | Sadler et al. | 361/221 |
| 4,967,322 | A | 10/1990 | DuBois | 362/102 |
| 5,043,527 | A | 8/1991 | Carpenter, Jr. | 174/2 |
| 5,048,571 | A | 9/1991 | Ellis | 138/96 |
| 5,113,167 | A | 5/1992 | Raudabaugh | 337/30 |
| D328,464 | S | 8/1992 | Liu et al. | D14/230 |
| 5,313,757 | A | 5/1994 | Schnepf | 52/301 |
| 5,374,137 | A | 12/1994 | Steinburg | 404/9 |
| D361,289 | S | 8/1995 | Fawthrop | D10/105 |
| 5,568,708 | A | 10/1996 | Kassardjian | 52/301 |
| 5,638,248 | A | 6/1997 | Fawthrop | 361/221 |
| 5,652,690 | A | 7/1997 | Mansfield et al. | 361/127 |
| 5,685,255 | A | 11/1997 | Arzu | 116/30 |
| 5,685,343 | A | 11/1997 | Smith | 138/89 |
| 5,687,772 | A | 11/1997 | Underwood | 138/96 R |
| 5,694,286 | A | 12/1997 | Fowler et al. | 361/220 |
| 5,729,941 | A | 3/1998 | Kassardjian et al. | 52/301 |
| 5,803,126 | A | 9/1998 | Zaro | 138/89 |
| 5,824,253 | A | 10/1998 | Kassardjian et al. | 264/275 |

OTHER PUBLICATIONS

"Air Terminal Accessories: HB–PP01C Air Terminal Point Protector", Heary Brothers Lightning Protection Co., Inc. Brochure, one page No Date.

"Air Terminal", Harger Lightning Protection advertisement, one page No Date.

"East Coast Lightning Equipment Webpage", ECLE, www.eastcoastlightning.com, Dec. 7, 2000, 4 pages, "Flathead, RH Series Extension Rod, and Safety Spring", The Protection Source webpage, http://safetypoint.com/html/description.html, Dec. 11, 1998, 4 pages.

Moore, C.B., "Report on a Competition Between Sharp and Blunt Lightning Rods", Published in the IEEE Transactions on Electromagnetic Compatability, New Mexico Institute of Mining and Technology, Mar. 10, 1997.

"Safety Ball Impalement Protection", Eritech Advertisement, one page No Date.

"Safety First Series: Impalement Protection for Lightning Rods", The Protection Source Brochure, one page, 1998.

"Spec Data: Thompson Lightning Protection for Buildings", Thompson Lightning Protection, Inc., Sep. 1968, 12 pages.

"The Look of the Old–Fashioned Glass Lightning Rod Balls", Smart Decorative Weather Vanes Catalog, by Robbin Metal Craft No Date.

* cited by examiner

BOTTOM VIEW

TOP VIEW

SECTION A - A

FRONT VIEW

SAFER LIGHTNING ROD AND WARNING SYSTEM

This application is the National Stage of International Application No. PCT/US99/20187, filed Sep. 1, 1999 which claims the benefit of U.S. Provisional Application No. 60/106,166, filed Oct. 29, 1998, hereby incorporated by reference.

I. TECHNICAL FIELD

Generally, this invention relates to lightning rods and warning systems that provide safety features when used around human beings. A safe lightning rod can be utilized to reduce the danger to humans working near lightning rods. Specifically, this invention relates to a variety of lightning rod components and configurations that have been particularly engineered to perform in relation to human parameters.

II. BACKGROUND ART

The primary purpose of lightning rod assemblies is to transmit electrical charges safely to ground and away from the structure on which they are mounted. As a consequence, the top of the unit must be properly sized and shaped to be conducive to a lightning strike and the appropriate materials must be selected to allow for conductivity.

One of the unresolved problems in the field has been to engineer a lighting rod or charge dissipator with a shape that is both conducive to a lightning strike and simultaneously minimizes the danger to humans from injury or impalement resulting from falling upon or striking the projecting terminal of the lightning rod.

Present configurations for lightning rods encompass terminal elements which taper to a long thin tip or to a point similar to those disclosed in U.S. Pat. Nos. Des. 305,309; Des. 305,104; 4,540,844; and 4,752,85 which pose significant impalement hazards to humans. Even when an air terminal tip is blunted or slightly rounded the air terminal may be an impalement hazard. Other lightning rod configurations have non-contiguous surf in which appendages such as fingers may be trapped or severed as disclosed in U.S. Pat. No. Des. 361,289. Additional lightning rod configurations terminate in non-hebetative edges that pose severe laceration hazards as disclosed in U.S. Pat. Nos. Des. 361,289 and 4,760,213.

Another problem with respect to lightning rod systems is that national safety standards for the design and engineering of lightning rods which address the prevention of human impalement or injury are only recently in the process of being formulated. As such, the shaft (or electrically conductive rod) and the terminal portion of lighting rods may not be engineered to be either deformable or force spreading in response to the application of the usual forces generated when a human of average size and weight falls upon or strikes the terminal portion of a lightning rod. As a result humans which fall upon a lightning rod terminal are at increased risk of injury or impalement because the appropriate preventative safety features may be lacking.

At least two problems have presented themselves from the consumer's perspective. First, is the need for a lightning rod system or lightning rod system components to retrofit existing lightning rods which upon installation limit potential liability from impalement or injuries to humans. Such a lightning rod system would be engineered in anticipation of those conditions which are typical for humans working near lightning rods mounted to buildings or other structures. Although, the dangers of impalement have been known and mitigated in other workplace environments for almost two decades as disclosed by U.S. Pat. Nos. 4,202,378 and 4,308,701 until the instant invention the use of a humanized engineering standard with respect to lighting rods was not achieved and the dangers of impalement had remained unresolved.

A second problem from the consumers perspective was obtaining a simple low cost lightning rod system for the protection of buildings or structures. To some degree those in the field were lead away from the solutions of the present invention. Improved lightning rod systems have generally included additional and more complicated parts as disclosed by U.S. Pat. No. 4,910,636 showing a multiplicity of fine wires which may become entangled, broken off, or deformed (also note that the support rod for the multiplicity of wires remains and impalement hazard); or as disclosed by U.S. Pat. No. 4,760,213 and U.S. Pat. No. Des. 361,289 which both incorporate elaborate hollow shells and the latter also including brush elements held within the shell. To the extent that this approach lead innovators to believe that this additional complexity was necessary to achieve adequate lightning protection for buildings teaches away from the less complex and economical approach of the instant invention.

III. DISCLOSURE OF THE INVENTION

Accordingly, the present invention provides lighting rod systems and warning systems having components specifically engineered to be both inexpensive and less complicated and yet, remain responsive to the impact of a falling human.

As one example of the danger of present lightning rods, imagine a worker on a rooftop carrying tools across the roof. The roof is comprised of a lightning protection system with many Franklin type lightning rods distributed across the rooftop. Now, imagine the worker tripping over a cable on the rooftop and falling on one of the lightning rods. Serious injury, such as the worker being impaled on the lightning rod, could easily result from impacting a traditional Franklin lightning rod or other conventional lightning rod system. As such, the broad goal of this invention is to incorporate safety features into lightning rod systems and warning systems to minimize the risk of impalement upon or the injury from the projecting air terminal of the lightning rod.

A surprising aspect of this invention was discovered in ascertaining the appropriate types of engineered components to incorporate as safety features to the lightning rod systems and warning systems. From these efforts, it has been discovered that both the electrically conductive end cap and the electrically conductive rod may incorporate engineered features such that they may be used either separately or in tandem to remediate impalement or minimize injury to a human from falling on the air terminal of a lightning rod system.

With respect to the electrically conductive end cap, one object of the invention was to engineer a contiguous hebetative impact surface having force disseminating termini which could be substantially centered over the end cap on the projecting air terminal. The surface area of contiguous hebetative impact surfaces and termini may be sufficient to effectively spread the impact force of a falling human such as to prevent impalement of a human and minimize injury even if the rod supporting the hebetative impact surface does not deform upon impact. Many examples of non-contiguous surfaces exist including those shown in U.S. Pat. Nos. 4,760,213; Des. 305,104; Des. 361,289. Openings such as those shown in the above mentioned patents present areas in which appendages such as fingers can be caught and possibly severed Moreover, these openings may provide access to the interior of the lightning rod assembly where additional components may also provide cutting or catching surfaces such as the brush elements in U.S. Pat. No. Des 361,289. Also, as can be understood from these same United States Patents, the terminal edges of the lightning rod components may not be sufficiently rounded to disseminate impact forces. Rather, it may be the case that the termini present potentially lacerating edges or have long tapered or pointed projections. These types of surface features which are generally believed to be necessary to initiate a lightning strike teach away from the broad goal of this invention which is to provide a lightning rod having an air terminal with a contiguous hebetative surface having force disseminating termini substantially centered over the lightning rod. The exact size and shape of the contiguous hebetative surface may vary based upon whether or not it is used in conjunction with other components, such as the rod, which are standardized to human parameters.

A related object of the invention is to remediate the impalement and injury hazard of existing lightning rods by retrofitting the projecting air terminal with an solid end cap having a electrically conductive contiguous hebetative impact surface substantially centered over the solid end cap. The ability to retrofit existing lightning rods may allow wide spread use of this safety feature in a manner that is both inexpensive and practical.

With respect to the electrically conductive rod, one object of the invention is to provide a humanized quantal rod which remains in the undeformed configuration in response to forces typically encountered in day to day use but deforms when a hum inadvertently falls upon it or strikes it. By defining the quantal deformation force as equivalent to that generated by a human of average size and weight falling from the surface on which the rod is attached onto the projecting air terminal surface of the rod without impalement, the rod is appropriately humanized to afford the appropriate level of safety for humans having to work near air terminal projections of lightning rods. As can be easily understood, the humanized quantal deformation threshold force may even vary with the size of the contiguous hebetative impact surface provided.

Yet another broad goal of the invention is to incorporate the above mentioned technologies into a warning air terminal system. This aspect of the invention, although not directly related to the protection of buildings from lightning strikes, utilizes the discovered technology above mentioned in conjunction with visibility enhancement materials to provide warning system which minimizes impalement or injury hazard.

Still another goal of this invention is to provide the consumer with a lightning rod system which is both inexpensive and easy to use while limiting the potential liability associated with injuries acquired from humans inadvertently falling upon or striking projecting air terminals. With respect to this goal, the instant lightning rod system provides basic components which are readily assembled and have low maintenance costs and also include the above mentioned safety features.

Naturally further objects of the invention are disclosed throughout the specification and claims.

IV. BRIEF DESCRIPTION OF THE DRAWINGS

V. MODE(S) FOR CARRYING OUT THE INVENTION

As mentioned, the present invention includes a variety of aspects which may be combined in different ways. Each of those aspects is first discussed separately.

Figure 1:
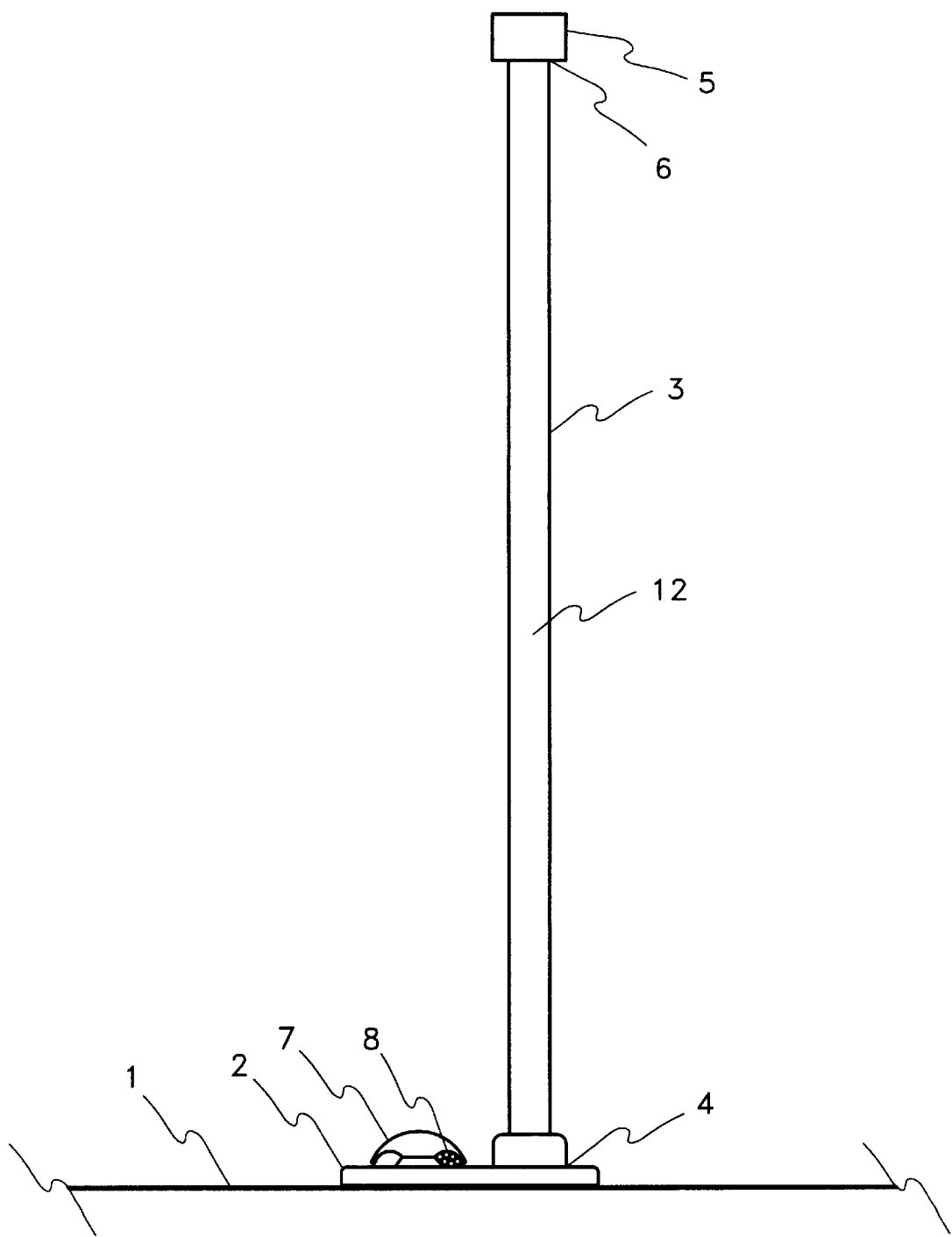
FIG. 1 is a drawing of a particular embodiment of the invention showing one example of a humanized quantal deformation rod with an end cap.
Figure 2:
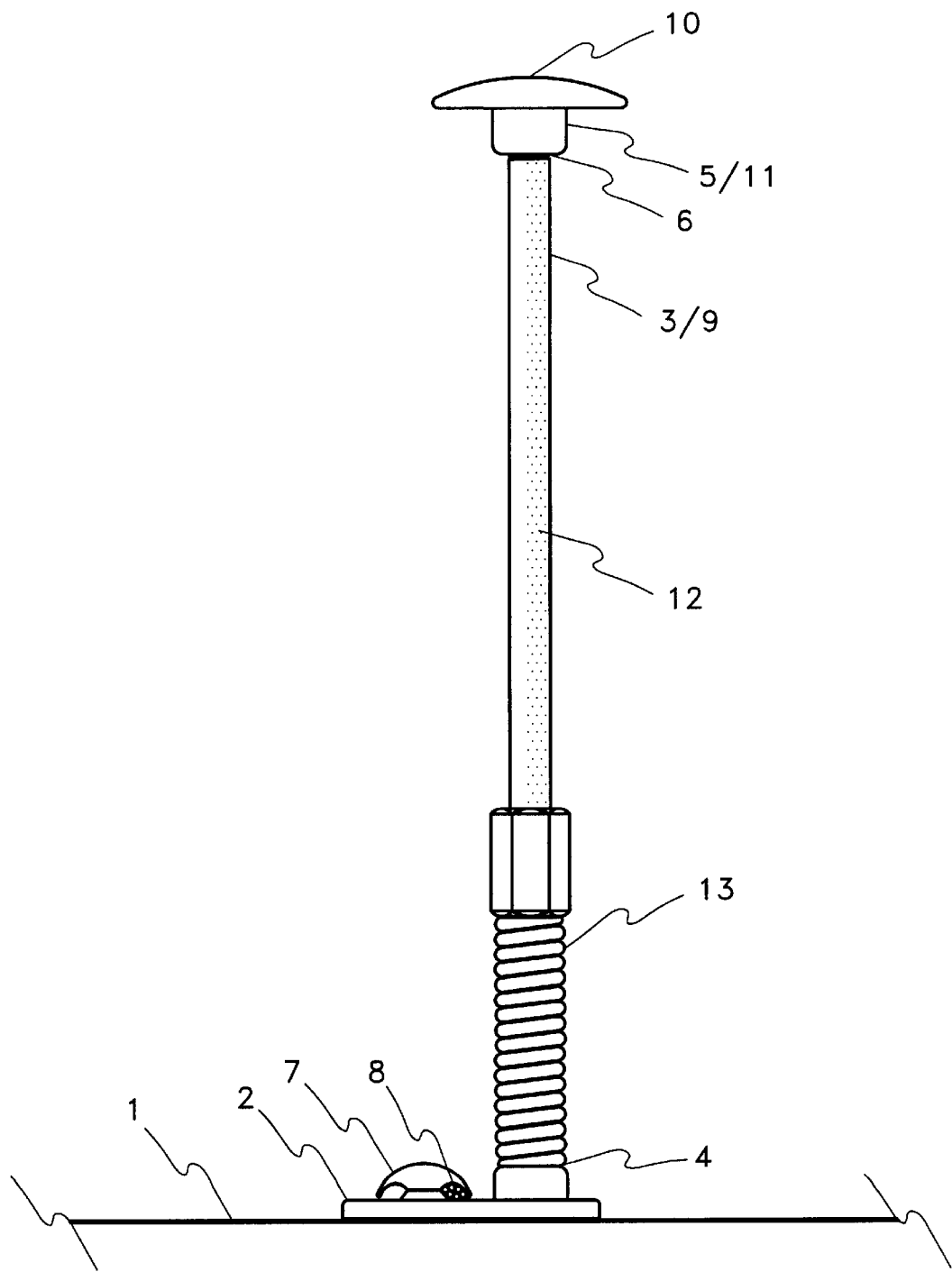
FIG. 2 is a drawing of a particular embodiment of the invention showing a humanized quantal deformation rod having a coil spring.
Figure 3:
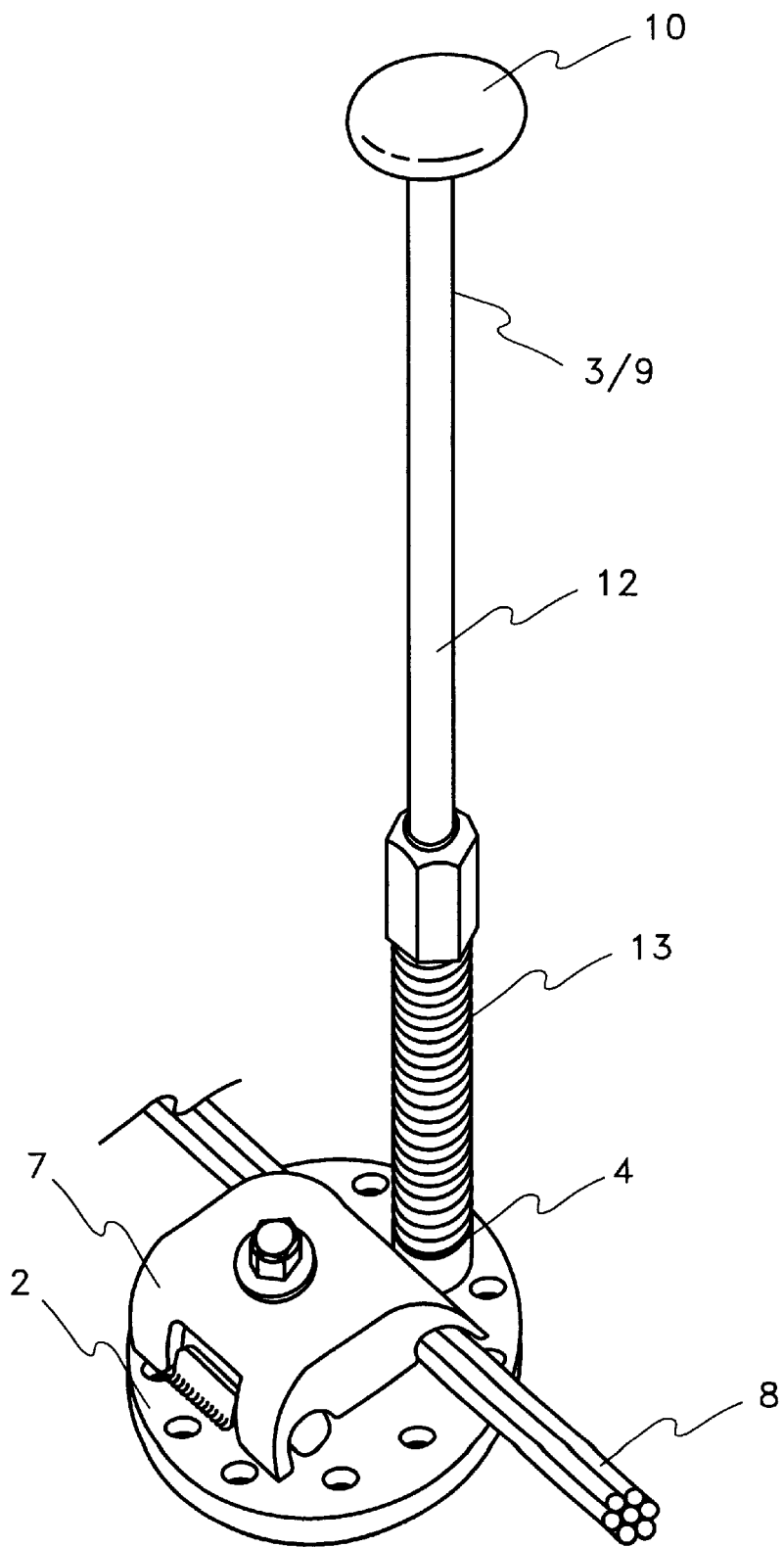
FIG. 3 is a drawing of a particular embodiment of the invention having a clamp for rounding the invention.
Figure 12:
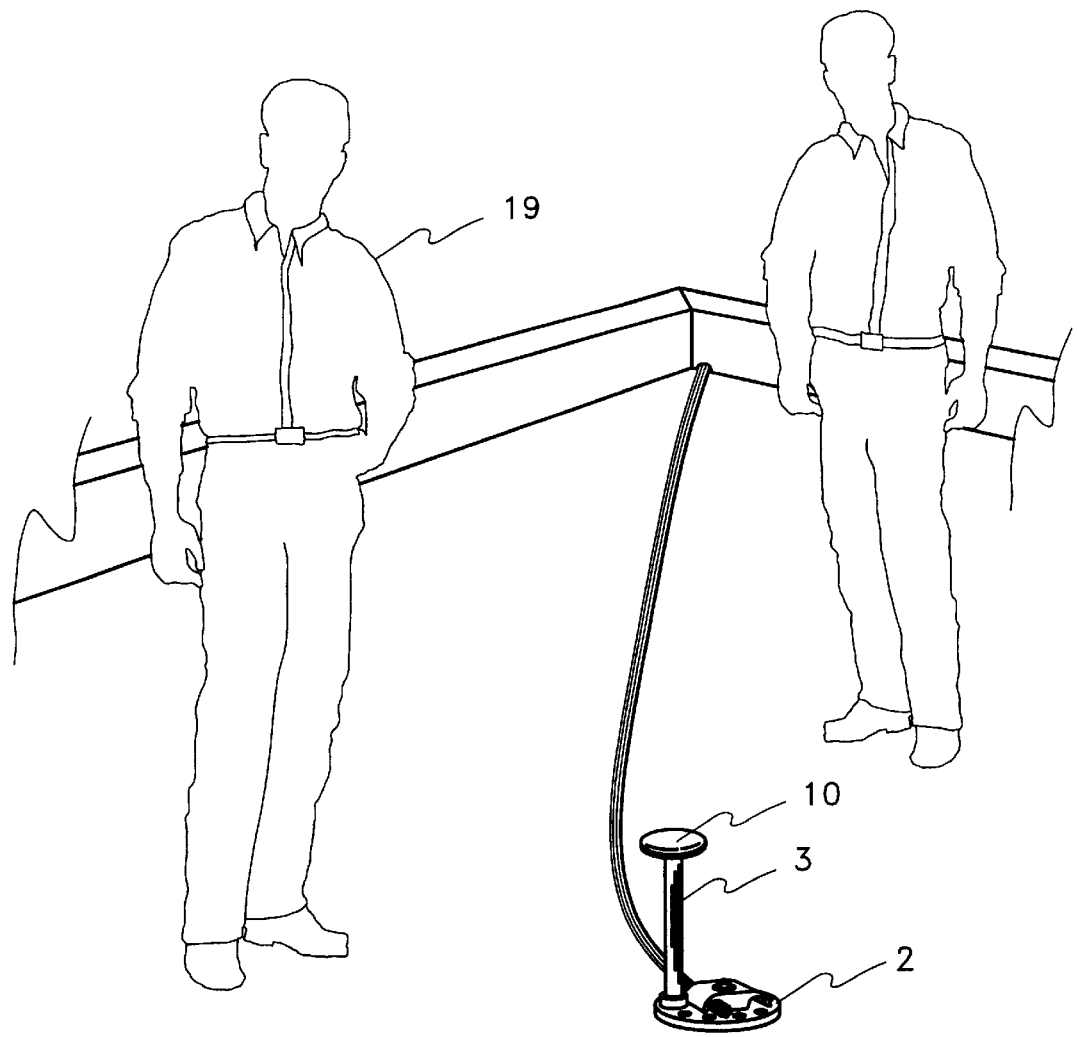
FIG. 12 is a drawing of a particular embodiment of the invention showing humans working around the area in which it is mounted to a building.
Figure 13:
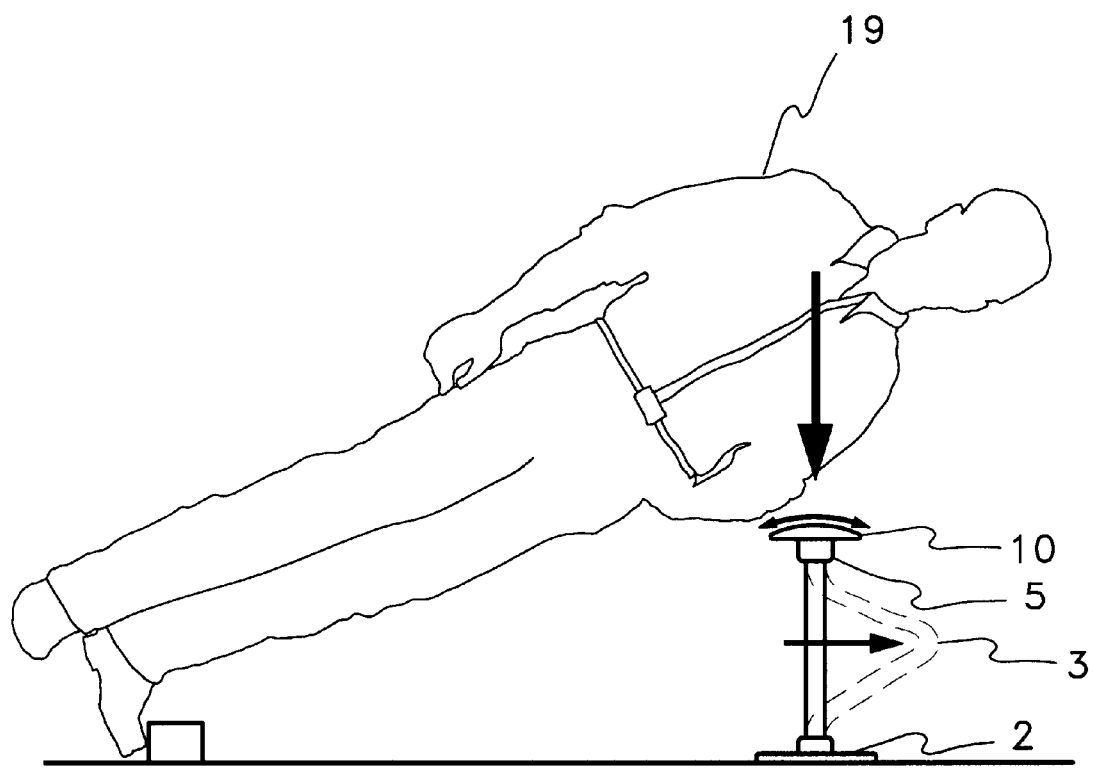
FIG. 13 is a drawing of a particular embodiment of the invention showing the spreading of forces applied to the electrically conductive hebetative impact surface from a failing human.
Figure 14:
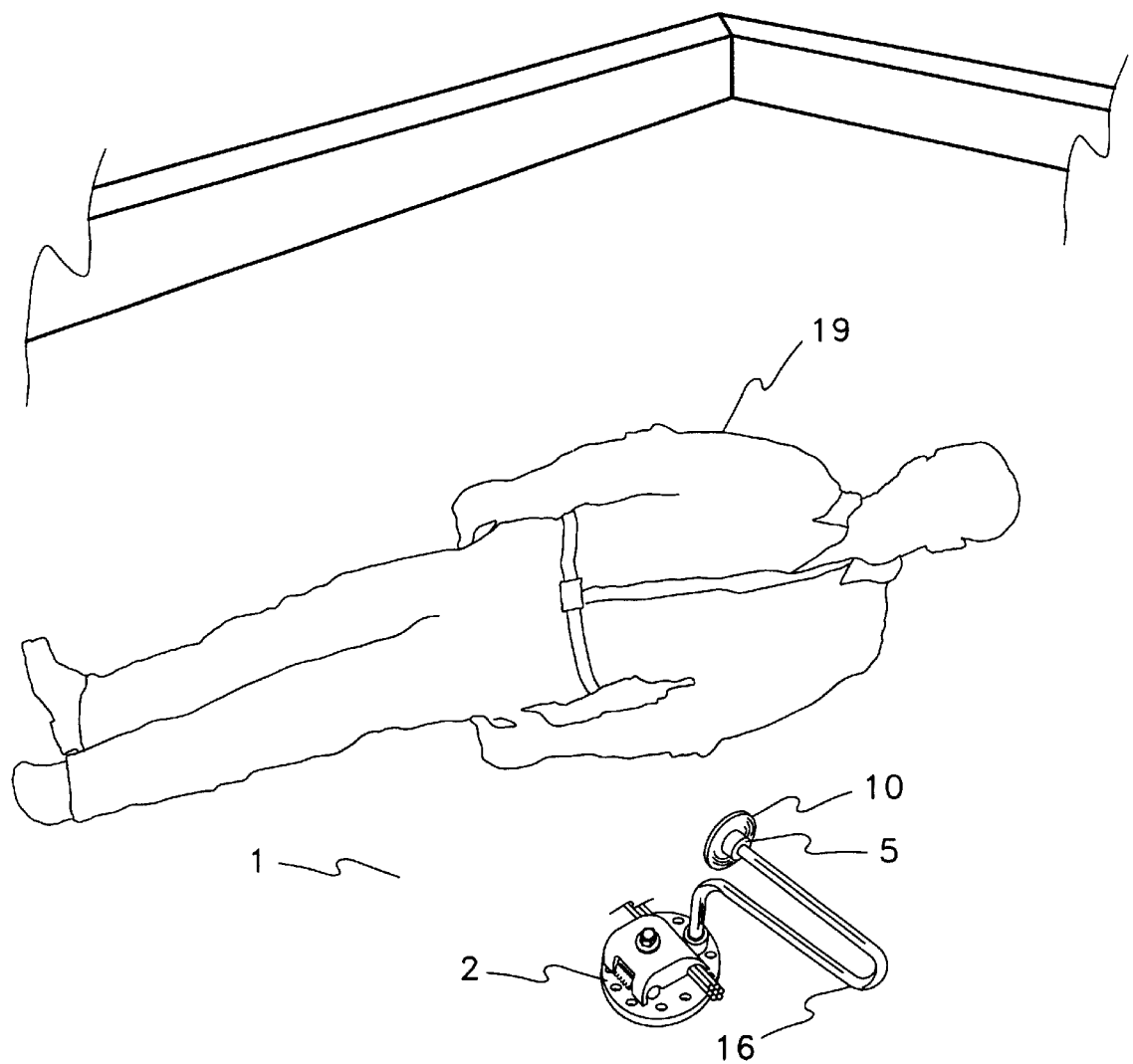
FIG. 14 is a drawing of a particular embodiment of the invention showing the force from a human spread to the larger surface area of a building.

An electrically conductive rod (which may be non-electrically conductive for use in the warning system version of the invention) is exemplified in FIGS. 1, 2, 3, 8, 9, and 10. As utilized in FIG. 1, the rod may be engineered to have humanized quantal deformation properties as a safety feature. In this embodiment, a humanized quantal deformation rod (3) may be intentionally engineered to deform when struck by a human, or when impacted by a falling human (as shown in FIGS. 12, 13, and 14). The deformed humanized quantal deformation rod (16) subsequently remains in the deformed state and is replaced with a undeformed component. The quantal deformation can be engineered to occur at a threshold range of applied forces which match the forces delivered from a filling human of average size and weight. Subsequently, the engineering may be corroborated by testing conducted by a qualified testing laboratory which certifies that the rod meets or exceeds these humanized quantal deformation standards. An example of such professional testing is that performed by Miller Safety Consulting of Denver, Colo. which provides a Certificate of Test that such humanized quantal deformation standards have been meet. This Certificate of Test which describes the testing protocol is hereby incorporated by reference. The humanized quantal deformation rod may also be engineered to meet or exceed existing state standards, such as Title 8 of California's Code of Regulations (T8CCR) §1712 or 29 C.F.R §1926.25 or §5(a)(1) of the Occupational Safety and Health Act which are hereby incorporated by reference. The rod could similarly be engineered to meet or exceed other state or federal statutory standards as well. Because the quantal threshold for deformation occurs in a humanized range of forces applied to the rod, incidental forces typically encountered in day to day use will be typically insufficient to cause deformation of the rod. A variety of electrically conductive materials including copper, aluminum, stainless steel, or MONEL™ as examples, may be engineered to have humanized quantal deformation properties. Of course, the particular specifications and configuration of the rod may vary with the material selected. In the embodiment shown by FIG. 1, the humanized quantal deformation rod (3) may be engineered to have humanized quanta deformation properties using a copper rod with a diameter of at least three-eighths but could be more for particular applications. It may also be engineered to have humanized quantal deformation properties using an aluminum rod with a diameter of at least one-half inch. The length of the humanized quantal deformation rod may be at least ten inches to meet existing government regulations and may have a range typically between about ten inches to twenty four inches but may be engineered to greater lengths for certain applications. The rod may have a longitudinal hollow space in all or a portion of the rod for use in some applications. The second end of the humanized quantal deformation rod (3) is fixed to an electrically conductive end cap (5) by an electrically conductive coupler (6). The end cap (5) might serve at least two functions. First, it can facilitate in serving as the conducting tip of a lightning rod (in place of the traditional pointed tip). Second, it can serve as a safety device to reduce the chances that a human will be impaled or injured if he or she falls or impacts the lighting rod. In this embodiment of the invention, one might utilize a surface of the lightning rod tip or electrically conductive end cap (5) that is somewhat large. For example, one might use a rounded tip of generally spherical contour having a diameter of about three-quarters inch in diameter or larger. The other end of the humanized quantal deformation rod is fixed to an electrically conductive mount (2) wish may have an electrically conductive clamp assembly (7) which is engaged to a grounded surface (8). As shown in FIGS. 2 and 3, the humanized quantal deformation rod (3) may be humanized, in part, by incorporating a coil spring (13) or the humanized quantal deformation rod may be engineered to incorporate a flexibly resilient material such as stainless steel as an example. In these embodiments of the invention, the humanized quantal deformation rod deforms upon impact by a falling human and may then automatically return to the non-deformed configuration.

Figure 4:
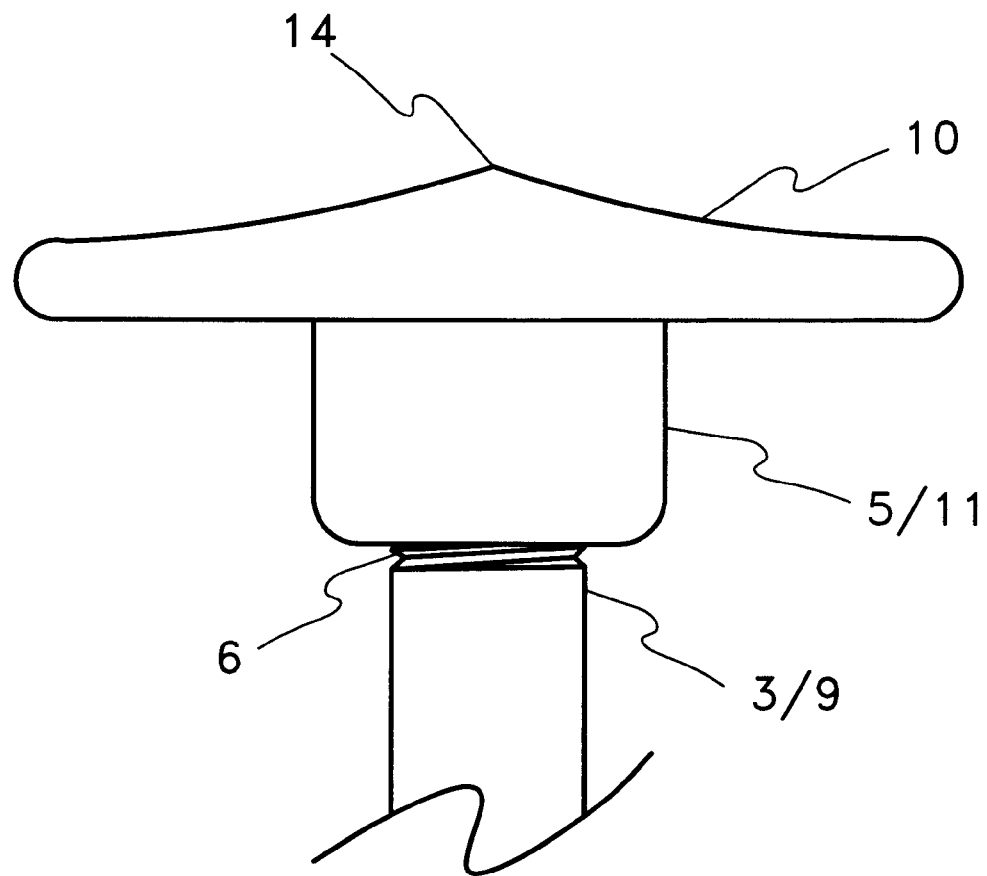
FIG. 4 is a drawing of a particular embodiment of a hebetative contiguous impact surface having a projecting element substantially centered over an end cap.
Figure 5:
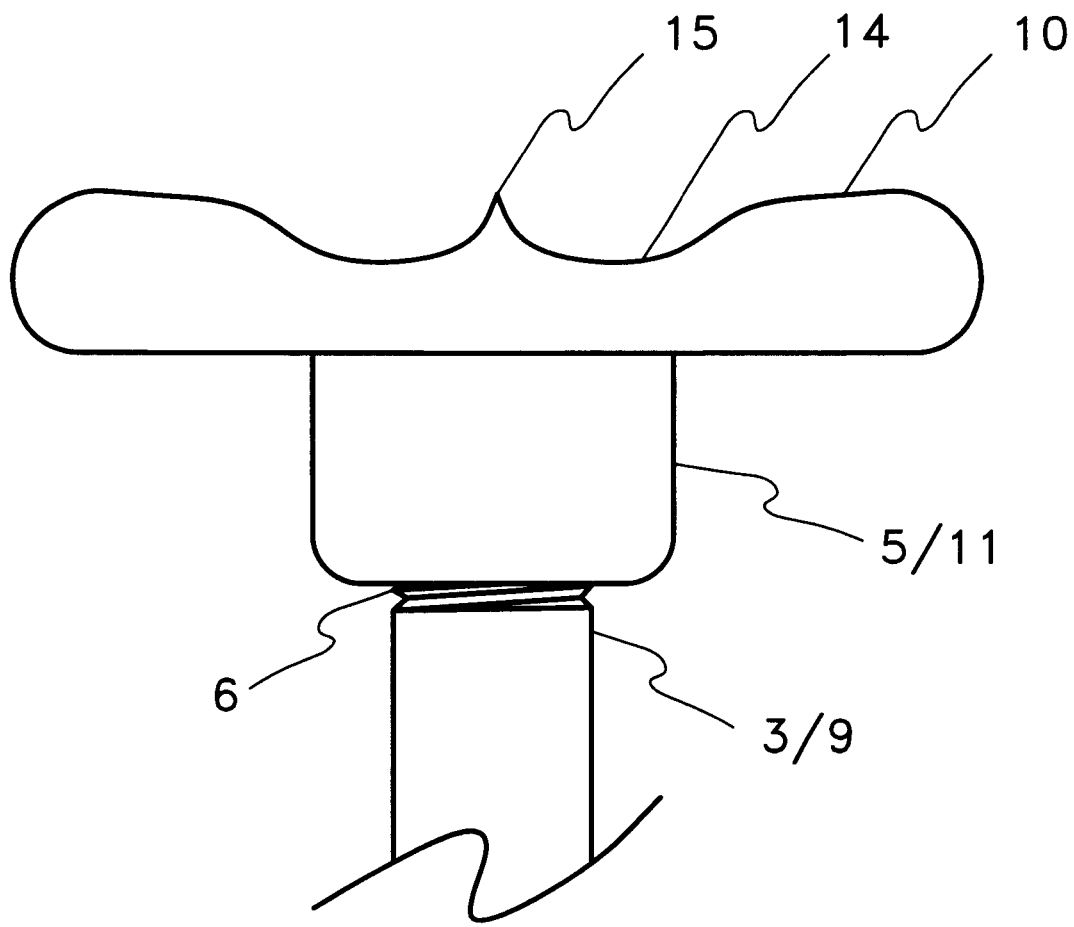
FIG. 5 is a drawing of a particular embodiment of a hebetative contiguous impact surface having a recessed projecting element.
Figure 6:
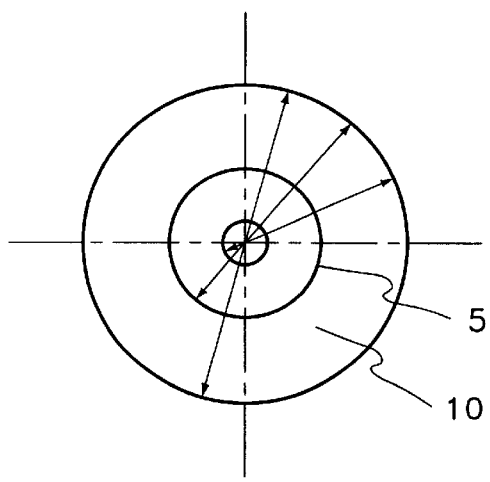
FIG. 6 is a drawing of a particular embodiment of a hebetative contiguous impact surface substantially centered over an end cap.
Figure 6:
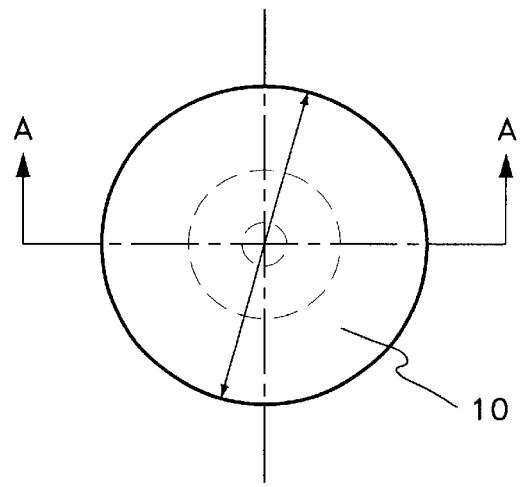
Figure 6:
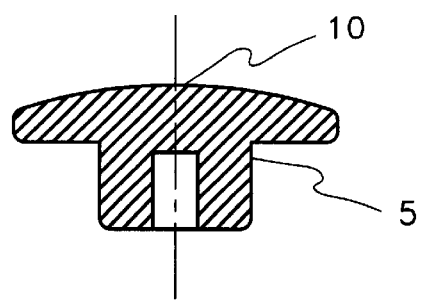
Figure 6:
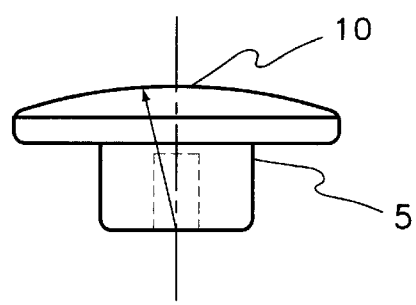
Figure 7:
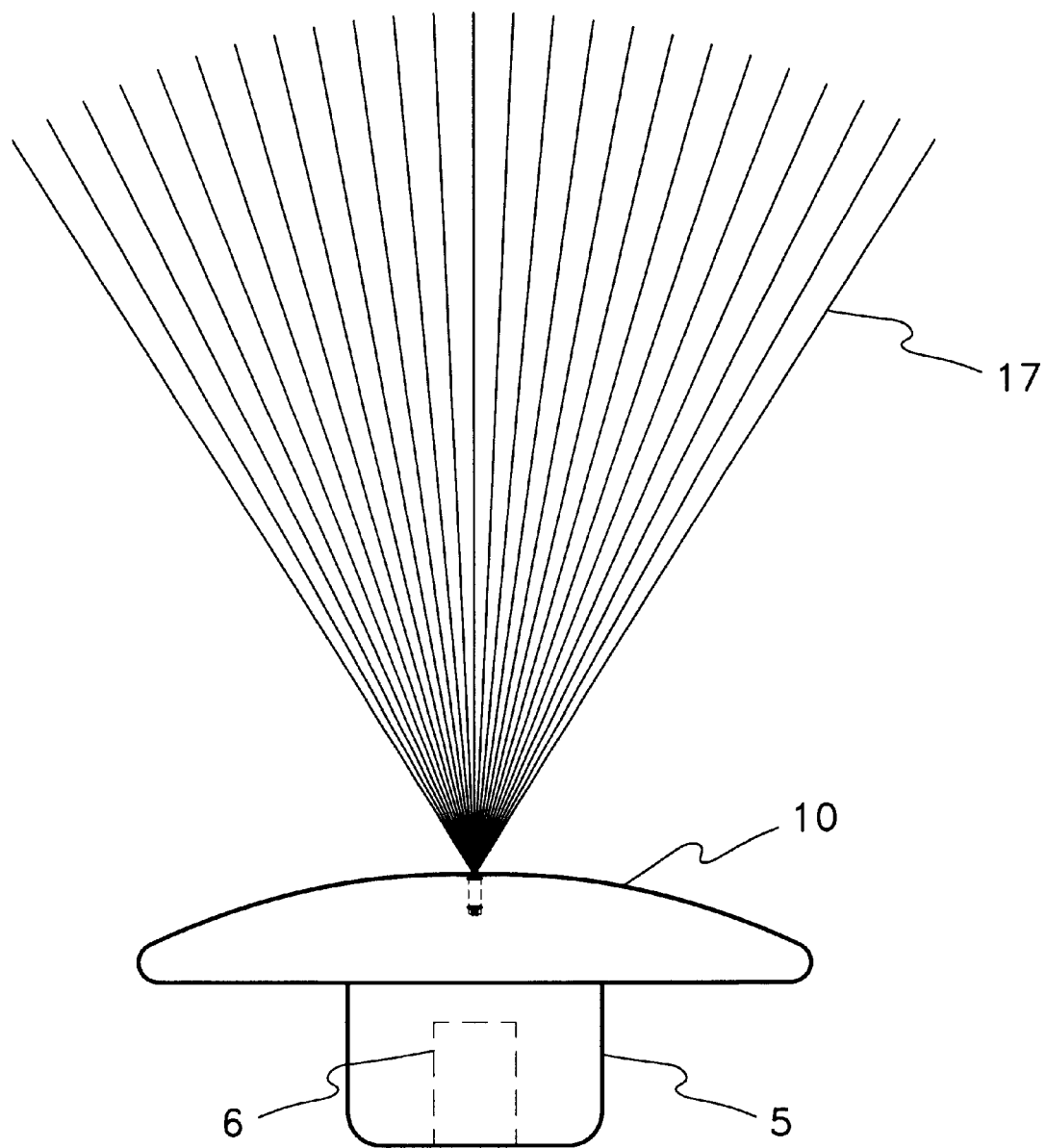
FIG. 7 is a drawing of a particular embodiment of a hebetative contiguous impact surface having a multiplicity of electrically conductive filaments.
Figure 8:
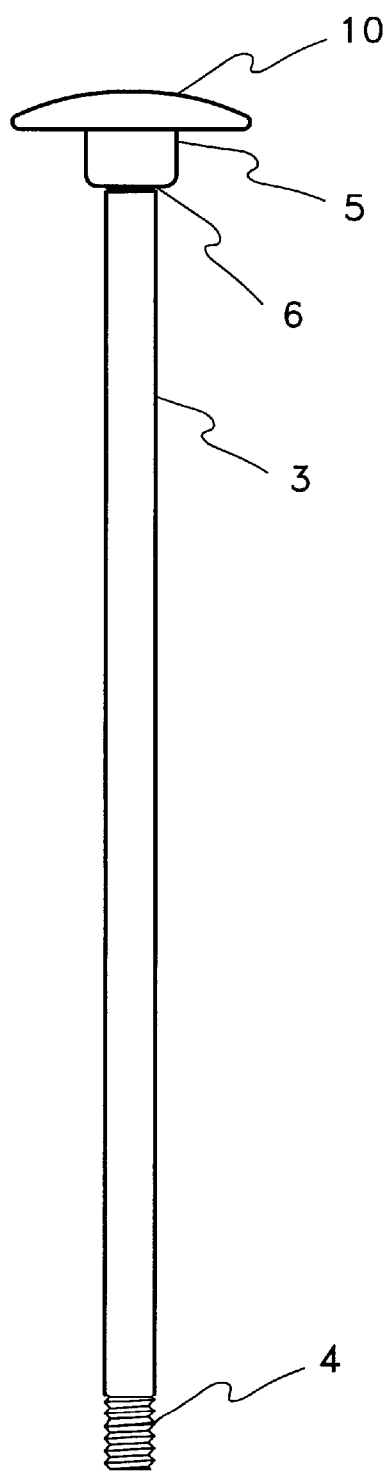
FIG. 8 is a drawing of a particular embodiment of a hebetative contiguous impact surface coupled to a humanized quantal deformation rod.
Figure 9:
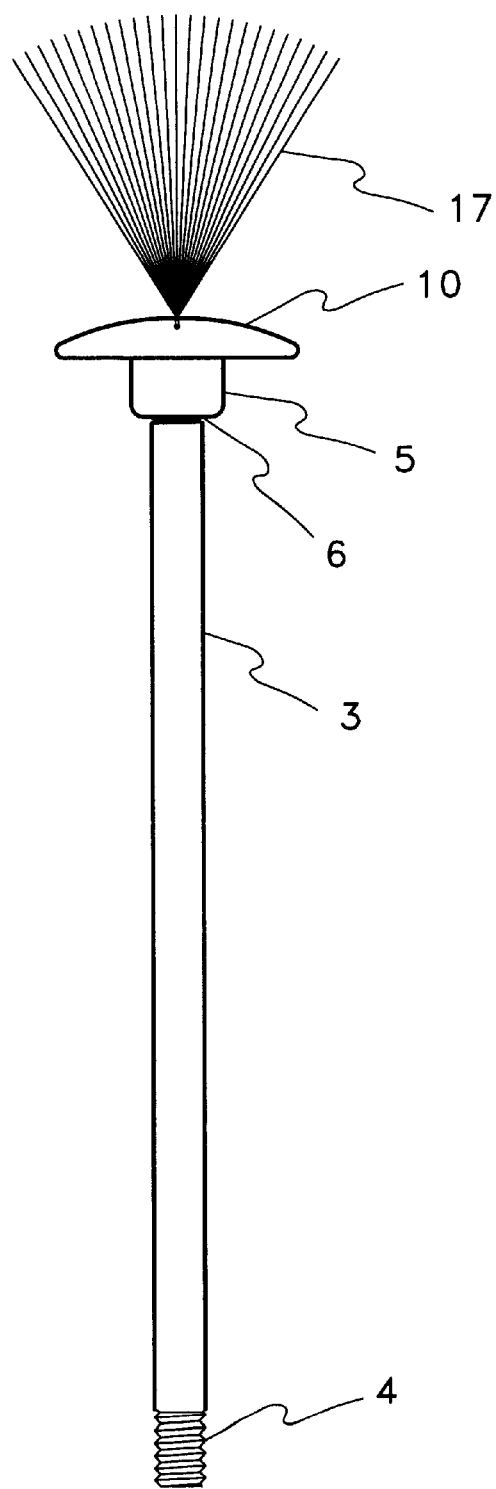
FIG. 9 is a drawing of a particular embodiment of a hebetative contiguous impact surface having a multiplicity of electrically conductive filaments coupled to a humanized quantal deformation rod.
Figure 10:
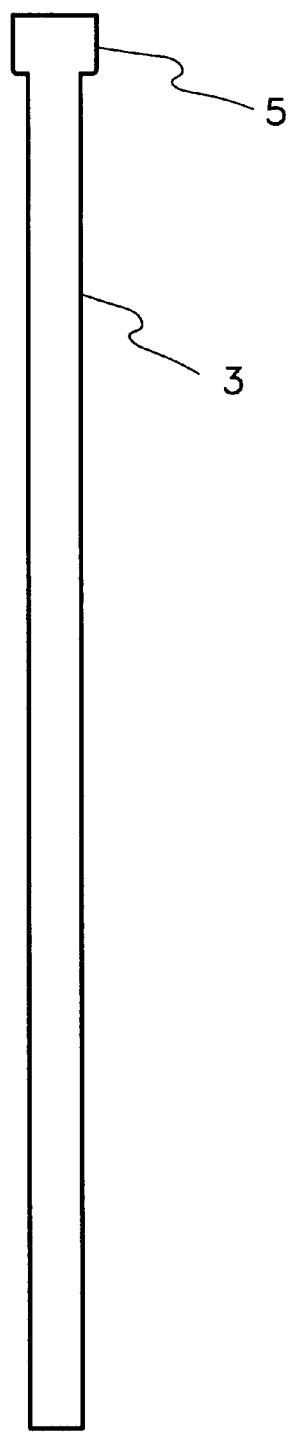
FIG. 10 is a drawing of a particular embodiment of an end cap coupled to a humanized quantal deformation rod.

As shown in FIGS. 2, 3, 4, 5, 6, 7, 8, 9, and 11, a larger hebetative contiguous impact surface (10) is responsive to the end cap. As shown in FIGS. 2, 3 and 6, a hebetative contiguous impact surface may be configured as a spherical cap having a radius of about two and three quarters inches or larger. In these embodiments, the diameter of the circle defined by the cross section of a sphere may be approximately two inches in diameter but could be larger—as the height of the sphere cap increases. Naturally, other disk shaped surfaces can be envisioned which could be engineered as separate components or as part of the rod itself These configurations accomplish the protective aspect of the invention by presenting an engineered hebetative contiguous impact surface (10) having force disseminating termini which may spread the force of a falling human over a greater surface area and reduce the possibility of laceration and as well as serving the function of lightning protection. However, it is anticipated tat an appropriately engineered contiguous hebetative impact surface or humanized quantal deformation rod or combination thereof may have to appropriately spread the force of a human falling from as much as ten feet above the impact surface (estimated to be a force upon the impact surface of about 12,755 pounds per square inch) such that impalement of the falling human may not occur and other injuries may be minimized. Typically, the end cap or contiguous hebetative impact surface would be made of a conductor of electricity, such as steel or other metals. It is also possible, for the end cap to be made of a non-electrical conductor (11) when used as a warning safety device. The electrically conductive or electrically non-conductive end caps might also be made removable form the shaft or rod. This would provide two advantages. For one, this would allow a variety of shapes to be used with a single base. FIG. 4 shows an embodiment of a hebetative contiguous impact surface with a nippled portion or projecting element (14). The projecting element would originate on the hebetative contiguous impact surface and be of a height and shape such that the impalement and laceration hazard is minimized. As shown in FIG. 5, the projecting element or nippled portion may actually be configured to be in a concave element whereby the terminal of the projection would be lower than the surrounding hebetative impact surface. As shown in FIG. 7, a flexible filament or a plurality of filaments (17) may also be incorporated into the hebetative contiguous impact surface. Each of these embodiments of the invention or others might be used interchangeably wit the same rod or humanized quantal deformation rod.

Figure 11:
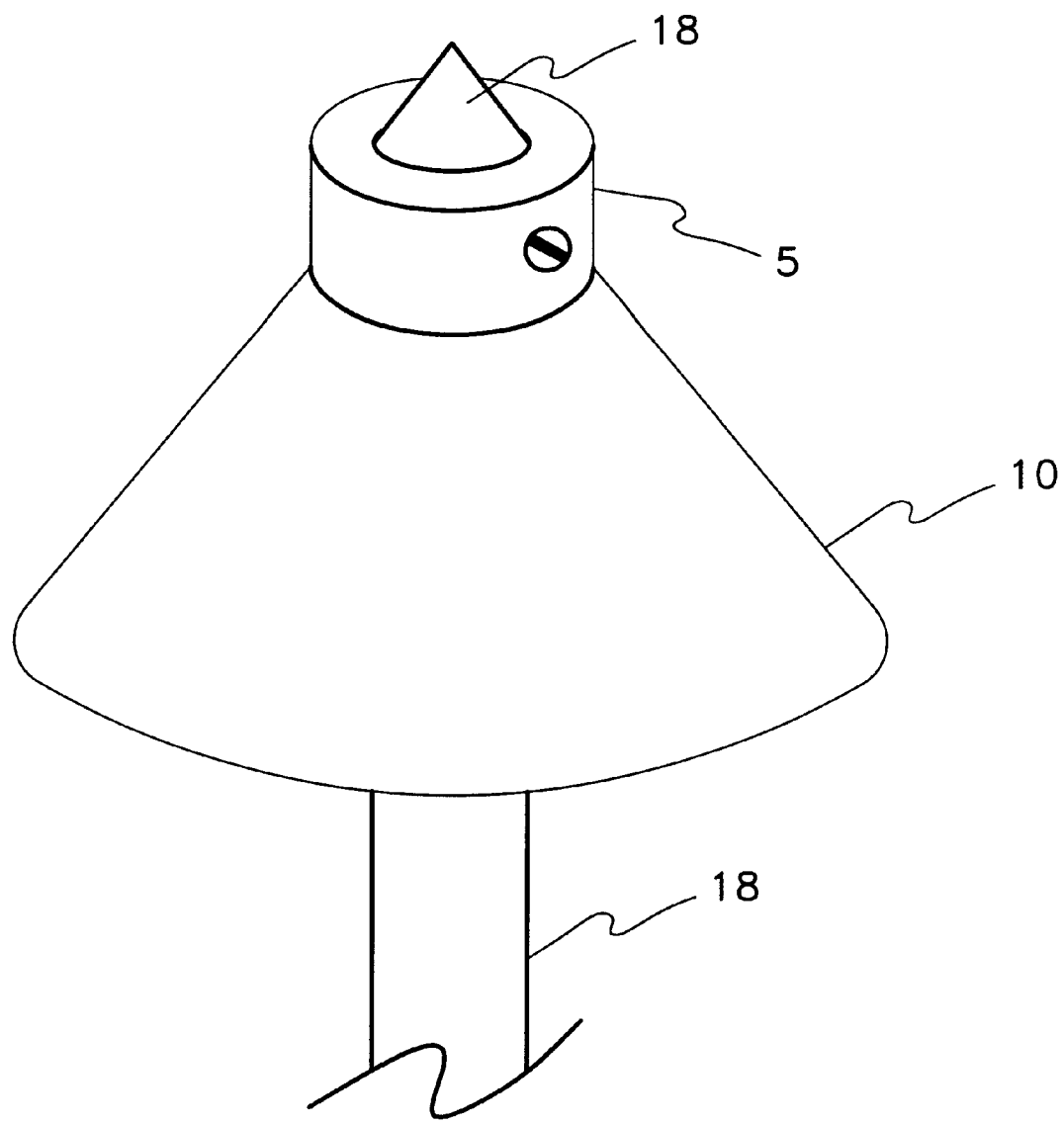
FIG. 11 is a drawing of a particular embodiment of a hebetative contiguous impact surface in which the rod comprises part of the contiguous impact surface.

Secondly, a solid end cap (S) having a hebetative contiguous impact surface, such as those shown in FIGS. 4, 5, 6, 7 or 11 may be configured to cooperate with traditional Franklin Rods or other existing lightning rod assemblies by sliding over the top of the Franklin Rod or other existing lightning rod assembly thereby establishing an electrical connection via that coupling, e.g., by being electrically connected to one another. This would serve as a convenient device to help remediate existing lightning rods that had pointed tips or were impalement or injury hazards trough retrofitting of the existing air terminal of the lightning rod assembly. With respect to lightning rods, such as Franklin lightning rods as an example, the hebetative contiguous impact surface may, in some embodiments of the invention, incorporate a portion of the tip of the existing lightning rod. The tip of the existing lightning rod may, for example, project through an annular end cap thereby presenting itself as part of the contiguous hebetative surface as shown in FIG. 11. The pointed surface of the existing air terminal may be blunted with an abrasive if desired. A blunt or rounded rod may be an impalement hazard if it projects sufficiently above a hebetative contiguous impact surface. Some of the embodiments of the invention are designed to remediate impalement hazards but may not fully remediate laceration hazards to the degree that other embodiments of the disclosed invention may.

The above mentioned humanized quantal deformation rod and the hebetative contiguous impact surfaces may be used separately or in conjunction with each other in a variety of ways. A hebetative contiguous impact surface such as those shown in FIGS. 4, 5, 5 6, 7, or 11 may be engineered to be affixed to a rod (9) that does not have humanized quantal deformation properties. Similarly, the humanized quantal deformation rod may be used with only an end cap (5) which may be only slightly larger than the diameter of the humanized quantal deformation rod itself as exemplified in FIGS. 1 or 10. The humanized quantal deformation rod may also be used in conjunction with a hebetative contiguous impact surfaces as exemplified in FIGS. 2, 3, 8, or 9.

As shown in FIGS. 12, 13, and 14, delivering a force from a falling human to at least a portion of the electrically conductive end cap (5) or hebetative contiguous impact surface (10) spreads the force over the entire surface area of the end cap or the hebetative contiguous impact surface reducing the per unit area force on the falling human. As shown in FIG. 13, the force is subsequently transferred to the rod (9) or humanized quantal deformation rod (3). In the case of the humanized quantal deformation rod, deformation of the humanized quantal deformation rod (3) again reduces the per unit area opposing force on the area of contact with the human being. Finally, as shown in FIG. 14, the humanized quantal deformation rod deforms to the extent it is no longer in rigid contact with the falling human (19) or deforms (16) so that it may contact the surface of the building (1) on which it is mounted, The impact of the falling human may be transferred to the larger building surface thereby minimizing harm to the falling human (19). As discussed above, the humanized quantal deformation rod may be engineered to re-establish itself to the undeformed position automatically after impact or may thereafter be replaced.

The other elements of the invention may be appreciated by first referring to FIG. 1 which shows an embodiment of the invention mounted to a building (1). In FIG. 1, an embodiment of the invention is disclosed in which a first end of the humanized quantal deformation rod (3) is electrically joined or electrically coupled to an electrically conductive mounting element (2) which may be configured to fix to a variety of building surfaces, such as exposed pipes. The electrically conductive joiner (4) may be a simple friction engagement of the first end of the humanized quantal deformation rod to the electrically conductive mounting element, or spin welding, or mated spiral threads as examples. The electrically conductive mount (2) and the humanized quantal deformation rod (3) may also be manufactured as a single unit, the electrically conductive joiner integral to the electrically conductive mount and the humanized quantal deformation rod. The mount as shown in FIG. 1 may also be designed to be fixed to an interior surface of the structure. In the second embodiment the rod passes through the surface of the structure and joined to the mount on the interior surface of the building. Additional gay wires may be attached to the first end of the rod for increased stability. FIGS. 2 and 3 show a clamp assembly or ground wire plate (7). The ground wire plate or clamp assembly (7) may be electrically coupled by frictional engagement to a ground wire (8) or other grounding surface (not shown in its entirety such as a pipe or wire to ground). A person of ordinary skill in the art would appreciate the other components of the lightning protection system.

As an additional safety feature, another embodiment of the invention could utilize a spring loaded base or coil spring coupler (13), as shown in FIGS. 2 and 3, to allow the lightning rod to be deflected out of the vertical position when impacted by a load. For example, when a human (19), of average size and weight falls on the lightning rod disclosed in FIG. 13, the force from the human would push the lightning rod out of its normal vertical position In this way, the human could then impact the ground with a greater portion of his body surface, and spread the weight of his body against a greater surface area—thus reducing the pressure on a specific portion of his body. The spring-loaded embodiment may then automatically become reestablished in its normal substantially vertical position.

In another embodiment of the invention, all the various components may incorporate a visibility enhancement material (12) which may be achieved in a variety of ways, for example, by application of visibility enhancement color, reflective material or phosphorescent material to all or a portion of the invention including but not limited to the electrically conductive mounting plate, the humanized quantal deformation rod, the end cap, the hebetative contiguous impact surface or otherwise.

In another embodiment of this invention, where lightning protection may not be at issue, an electrically non-conductive solid end cap may be used with a hebetative contiguous impact surface or with the humanized quantal deformation rod or in various combinations with the other above mentioned components as a warning air terminal system to provide notice to humans of potential hazards. With regard to a warning air terminal, all the various components may incorporate visibility enhancement material (12) which may be achieved in a variety of ways, for example, by application of visibility enhancement color, reflective material, or phosphorescent material to all or a portion of the invention. Of course, enhancing the visibility of any of the embodiments of the invention would be appropriate. In another embodiment of this invention, the above mentioned enhancement materials may be applied to any portion of an existing lightning rod system to achieve visibility enhancement which may be observed by humans working in the proximity of the lightning rod system and the hazards of striking or falling upon the lightning rod system may be avoided.

It is thought that the apparatuses and methods of the embodiments of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes the action. Similarly, each physical element disclosed should be understood to encompass a disclosure of the action which that physical element facilitates. Regarding this last aspect, and as but one example the disclosure of a "coupler" should be understood to encompass disclosure of the act of "coupling"—whether explicitly discussed or not—and, conversely, were there only disclosure of the act of "coupling", such a disclosure should be understood to encompass disclosure of an "coupler". Such changes and alternative terms are to be understood to be explicitly included in the description.

Any references mentioned, including but not limited to the references in the application to Federal or State Standards, in this patent are hereby incorporated by reference or should be considered as additional text or as an additional exhibits or attachments to this application to the extent permitted; however, to the extent statements might be considered inconsistent with the patenting of this/these invention(s) such statements are expressly not to be considered as made by the applicant. Further, the disclosure should be understood to include support for each feature, component, and step shown as separate and independent inventions as well as the various combinations and permutations of each.

In addition, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like.

I claim:

1. A lightning protection device, comprising:
   a. an electrically conductive mount;
   b. an electrically conductive rod having a first end and a second end, wherein said rod has a diameter between about three-eighths inch and about five-eighths inch;
   c. an electrically conductive joiner element responsive to said first end of said electrically conductive rod and to said electrically conductive mount;
   d. an electrically conductive end cap;
   e. an electrically conductive coupler responsive to said electrically conductive end cap and to said second end of said electrically conductive rod; and
   f. a hebetative contiguous impact surface responsive to said electrically conductive end cap, wherein said hebetative contiguous impact surface defines an approximately spherical contour having a diameter between about three-quarters inch and about five and one-half inches.

2. A lightning protection device as described in claim 1, further comprising a electrically conductive clamp assembly coupled to said electrically conductive mount.

3. A lightning protection device as described in claim 2, further comprising a grounded surface electrically engaged to said clamp assembly.

4. A lightning protection device as described in claim 1, wherein said electrically conductive end cap is comprised of a material selected from a group consisting of brass, copper, or aluminum.

5. A lightning protection device as described in claim 1, wherein said hebetative contiguous impact surface responsive to said electrically conductive end cap has a surface area equal to or greater than about three square inches.

6. A lightning protection device as described in claim 1, wherein said hebetative contiguous impact surface comprises a substantially spherical cap having a radius between about three-eighths of an inch and about two and three-quarters inches.

7. A lightning protection device as described in claim 1, wherein said hebetative contiguous impact surface further comprises at least one concave element.

8. A lightning protection device as described in claim 1, further comprising an electrically conductive coil spring having a first coil spring end coupled to said electrically conductive joiner element and a second coil spring end responsive to said first end of said electrically conductive rod.

9. A lightning protection device as described in claim 1, wherein said electrically conductive rod comprises a humanized quantal deformation rod.

10. A lightning protection device as described in any one of claims 1, 5, or 6, comprising:
    a. at least one electrically conductive filament; and
    b. an electrically conductive filament coupler responsive to said at least one electrically conductive filament and to said hebetative contiguous impact surface.

11. A lightning protection device as described in claim 10, wherein said at least one filament having a proximal end and a distal end comprises a plurality of long fine electrically conductive metal, untwisted wires.

12. A lightning protection device as described in claim 11, wherein said plurality of long fine electrically conductive metal, untwisted wires have ends positioned in said filament coupler which allows said wire to project upwardly from said hebetative contiguous impact surface in a mushroom-shaped manner.

13. A lightning protection device as described in claim 12, wherein said electrically conductive filament coupler has been recessed at least flush with said hebetative contiguous impact surface.

14. A lightning protection device as described in claim 10, further comprising said visibility enhancement element coupled to said lightning protection device.

15. A lightning protection device as described in claim 14, wherein said visibility enhancement element comprises a light reflective material.

16. A lightning protection device as described in claim 14, wherein said visibility enhancement element comprises a phosphorescent material.

17. A lightning protection device as described in claim 14, wherein said visibility enhancement element comprises a colored material.

18. A lightning protection device as described in claim 10, further comprising a building to which said lightning protection device is fixed.

19. A lightning protection device as described in any one of claims 1, 5, 6, 7, 9, further comprising a visibility enhancement element coupled to said lightning protection device.

20. A lightning protection device as described in any one of claim 19, wherein said visibility enhancement element comprises a light reflective material.

21. A lightning protection device as described in any one of claim 19, wherein said visibility enhancement element comprises a phosphorescent material.

22. A lightning protection device as described in claim 19, wherein said visibility enhancement element comprises a colored material.

23. A lightning protection device as described in claims 1, 6, 7, 8 or 9, further comprising a building to which said lightning protection device is fixed.

24. A method of lightning protection, which comprises the steps of:
    a. fixing a mount to a surface;
    b. joining an electrically conductive rod having a first end and a second end to said mount by said first end, wherein said electrically conductive rod has a diameter between about three-eighths of an inch and about five-eighths inch;
    c. coupling an electrically conductive end cap to said second end of said electrically conductive rod; and d. providing a hebetative contiguous impact surface responsive to said electrically conductive end cap, wherein said hebetative contiguous impact surface defines an approximately spherical contour having a diameter between about three-quarters inch and about five and one-half inches.

25. A method of lightning protection as described in 24, further comprising the step of clamping said mount to an electrically grounded surface.

26. A method of lightning protection as described in claim 24, further comprising the step of configuring a portion of said hebetative contiguous impact surface to have at least one concave feature.

27. A method of lightning protection as described in claim 24, further comprising the steps of:
   a. providing at least one electrically conductive filament; and
   b. coupling said at least one electrically conductive filament to said hebetative contiguous impact surface.

28. A method of lightning protection as described in claim 27, wherein said step of coupling said at least one electrically conductive filament to said hebetative contiguous impact surface comprises the step of recessing said coupling at least flush with said hebetative contiguous impact surface.

29. A method of lightning protection as described in claim 24, further comprising the step of quantalizing said electrically conductive rod.

30. A method of lightning protection as described in claim 29, further comprising the step of humanizing said electrically conductive rod.

31. A method of lightning protection as described in claim 24, further comprising the step of joining a coil spring to said mount and to said first end of said electrically conductive rod.

32. A method of lightning protection as described in claim 31, further comprising the step of re-establishing said electrically conductive rod to a non-deformed position automatically.

33. A method of lightning protection as described in any one of claims 24, 25, or 27, further comprising the step of coupling a visibility enhancement element.

34. A method of lightning protection as described in any one of claim 33, wherein said visibility enhancement material comprises a reflective material.

35. A method of lightning protection as described in any one of claim 33, wherein said visibility enhancement material comprises a phosphorescent material.

36. A method of lightning protection as described in claim 33, wherein said visibility enhancement material comprises a colored material.

37. A method of lightning protection as described in claims 24, 26, 27, 29, 30 or 31, further comprising the step of protecting a building from lightning.

* * * * *